Patented Jan. 29, 1952

2,583,686

UNITED STATES PATENT OFFICE 2,583,686

PROCESS FOR TREATING A FOOD PLANT PRODUCT

Jack De Ment, George Lamont, and Jim Polly, Portland, Oreg.

No Drawing. Application June 15, 1950, Serial No. 168,389

5 Claims. (Cl. 99—154)

This invention relates to composition and method for treating certain food plants; in particular, to the enhancement of the whiteness and esthetic appearance for substantially white plant tissue used as food and, concurrently, to the prevention of discoloration, browning and wilting.

Among the objects of the present invention are the following:

(a) To provide the foodstuffs art with method and composition for the treatment of certain substantially white food plant tissue, whereby a product of improved whiteness and esthetic appeal is obtained, without altering the food value or taste and without imparting detrimental properties to the food. Herein, the term food plant will be taken to include such naturally white or light colored fruits and vegetables as potatoes, apples, radishes, onion, celery, cucumber, white turnips and parsnips, and the hearts of cauliflower, cabbage, lettuce, and the like;

(b) To provide improved compositions and methods for the treatment of certain food plants, such as the above named articles, whereby discoloration, browning, wilting or softening are much reduced or eliminated, permitting longer storage under refrigeration and, concurrently, the improvement of the appearance of the food product.

Other objects of this invention are set forth subsequently.

In the present art, peeled or prepared, raw food plants, say potatoes, apples, salad mixes and the like, are often packaged in transparent plastic bags for selling to the consumer. These food products are not usually stored for periods of months under refrigeration, but generally are placed on the counters for sale within a few days, temperatures of between say 35 and 55 deg. F. often being relied upon to enhance this period, freezing temperatures usually being avoided (in contrast to the phase of the art wherein certain fruits and vegetables are placed in the so-called "deep freeze"). As is well known in the art, white food plant tissue, such as that of the potato, the apple, lettuce and the like, is extremely susceptible to discoloration, to wilting or softening, and to loss of that white quality upon which the consumer generally relies in making his choice of product.

The following examples describe particular compositions and methods we have found satisfactory in achieving the above given objects of our invention, directed to solving the above mentioned problems of the art; it is to be understood that these examples are submitted only by way of illustration and not limitation. In particular, we stress to those skilled in the art that the compounds employed must be lacking in toxic qualities and, much to be preferred, lacking substantially objectionable odor or taste.

Example 1.—Raw, peeled potatoes, or other of the food plants mentioned previously, just after removal of the cortex (when that is present), were immersed for varying periods in an aqueous solution containing between approximately 0.001 and 1 per cent (or, up to saturation) of one of the following compounds: 7-hydroxy-4-methylcoumarin; 2-naphthol-3,6-disulfonic acid (alkali salt, preferably sodium or disodium); naphthalene-1,3,6-trisulfonic acid salt (alkali salt, preferably sodium or disodium). The latter two sulfonic acid compounds are cited as preferable, but not to be excluded are other sulfonic acid derivatives, as for example alkali salts (e. g., Na or 2Na) of 2-naphthol-$y$-sulfonic acid, where $y$ may be 3, 4, 5, or 7; $x$-naphthol-$y$-disulfonic acid alkali salt, where $x$ may be 1 or 2, and $y$ may be (3,6), (1,7), (3,7) or the like; and, 2-naphthalene-1,3,6,7-tetrasulfonic acid alkali salt.

The food article was immersed for period which varied between about 15 seconds and as high as one hour, as determined by the density and sorptivity of the tissue, a period of about 3 to 15 minutes being an optimum, and then allowed to drain.

Examination showed that the substantially white or light flesh of the food plant was of considerably improved appearance, the natural yellow and brown tints usually seen in such tissue having been cancelled out; this cancellation is presumably due to the blue fluorescent quality exhibited by the colorless compound complementing the yellow or brown tint. Under filtered ultra-violet light the product, after treatment, fluoresced a brilliant blue, and the results were the best with the 7-hydroxy-4-methylcoumarin.

Several food experts examined the treated products for taste and any artificial attribute that might have been imparted, and none discerned any objectionable taste. These compounds are all nontoxic in the concentration and forms employed.

The treated products were then placed under refrigeration, at temperatures above freezing, to assay their keeping qualities. After a period of five days no untoward change had occurred, except for a slight dehydration; after a period of ten days a very slight browning began to make its appearance, and some of the leafy foods began to wilt. Celery and potatoes kept the best.

The antibrowning and like behavior of the samples thus prepared seemed in proportion to the number of sulfonic acid groups present in the blue fluorescent compound, which is to be expected from the theory of the art which involves sulfiting, sulfur dioxide and like compounds, as will be described in more detail subsequently. The similar behavior of the 7-hydroxy-4-methylcoumarin, in the retardation of discoloration, is believed due to the fact that this material is a reducing agent, and therefore is antagonistic to oxidative-enzymatic processes which are responsible for the discoloration and cell breakdown of food plant tissue.

*Example 2.*—The treatment of food plant material, set out under Example 1, was repeated, except that variations in the formulation were employed.

The blue fluorescent, colorless water solutions were prepared as before, and between approximately 0.1 and 4% salt or natural sea salt added, or, sugar, in the same amounts, of the two the salt being preferred. The concentrations were not found critical, except that on the upper limits the taste became evident, and below 0.1% the antioxidative or like action, which appeared synergistic between the blue fluorescent compound and the salt or sugar, did not seem substantially enhanced.

The immersing periods were the same as before; it was found preferable to employ deaerated water in making up the solutions, using a swirling motion to place the ingredients in solution; that is, boiled water, having had the air expelled, contains less oxygen than fresh cold water, which oxygen would contribute to the oxidative or like processes, reducing the efficacy of the present improvement. Carbonated water (e. g., the so-called Seltzer water) can also be used with satisfactory results.

With 0.6% sugar or salt and 0.4% 7-hydroxy-4-methylcoumarin, a shredded mixture of white cabbage, celery, and cauliflower remained fresh and attractive for five to eight days under refrigeration not involving freezing temperatures. Again, these concentrations are illustrations, as mentioned supra, and can be varied with equally satisfactory results.

*Example 3.*—By adding one of the blue fluorescent, colorless compounds, supra, to sulfite base antibrowning compositions known in the art (e. g., U. S. 2,475,838), with or without such compounds as ascorbic acid, an improvement in the appearance of the food product was obtained, and the storage qualities were very satisfactory.

Between about 0.001 and 0.3% of blue fluorescent compound was placed in a water solution carrying between approximately 300 and 1000 parts-per million of sulfite (as sodium bisulfite), and this solution employed for treating the plant food. As desired, between 0.5 and 1% of sodium chloride or sea salt can be added, and this mixture, additionally, can be reinforced with between approximately 0.03 and 0.5% ascorbic acid. When the salt and/or ascorbic acid are present, the antibrowning action is more pronounced. However, with high salt concentrations, upwards of 2%, a salty taste becomes evident.

New potatoes as well as apples, peeled and cut into slices, were dipped into the above solutions; similar tests were made with light colored leafy vegetables, and the other food plants previously. The treated articles were then sealed in plastic bags (cellophane, polyethylene or the like) and placed under refrigeration (between about 35 and 55 deg. F.) and examined periodically.

After a period of ten days the potatoes and apples, salad mixes, and like products, were very white and fresh appearing. After fifteen days the potatoes still retained a fresh whiteness, though control potatoes had already begun to discolor; control apples, at this time, were very dark, but the peeled apples were white and edible, these characteristics remaining as long as three weeks. At fifteen days, cucumbers and lettuce showed only a slight wilting, the cucumbers becoming slightly slimy, but retaining a good appearance. Control cucumbers became wholly inedible, showing wilting (softening), sliming, and eventually a hard crust.

These lengthy values are cited to show the keeping properties at periods that would far exceed normal practice. In customary practice several days are generally involved before the edibles are consumed and, in reality, unsold articles, after several days, must be disposed of because of unsaleability. The reason for this unsaleability is browning and wilting and like changes.

We have found that partly filling a bag reduces the keeping time by a factor of up to 50%, whereas a full bag, with as little air as possible, keeps more satisfactorily. A pellet of carbon dioxide (frozen carbon dioxide, "dry ice"), in common with knowledge of the art, can also be employed to enhance keeping and appearance characteristics, or, a vacuum can be drawn on the package after filling and just prior to sealing.

We are aware of the prior art in antibrowning compositions, which art has relied upon sulfur dioxide gas, sulfurous acid, and soluble inorganic sulfites, and we have referred to these compositions generically, emphasizing that none of the prior art has involved the improvement of whiteness and therefor of appearance and esthetic qualities of substantially light colored food plant products by suitable colorless blue fluorescent materials, and, at the same time, we believe that none of the prior art has revealed that the blue fluorescent compounds are effective as antioxidants, antidiscoloring agents and the like, as for example the soluble organic sulfonic acid compounds, the hydroxycoumarins and the hydroxycoumarones.

We claim:

1. The process for treating a food plant product selected from the group consisting of naturally light colored food plant products which comprises dipping the said food plant product in a water solution of a substantially colorless blue fluorescent material, the said blue fluorescent material being non-toxic and lacking in objectionable taste and odor, the said blue fluorescent material being selected from the group of substances consisting of soluble organic sulfonic acid compounds, hydroxycoumarins and hydroxycoumarones.

2. The process of treating a naturally light colored food plant product which comprises the immersion of the said food plant product in a water solution of blue fluorescent material and soluble inorganic sulfite compound, said solution containing between approximately 300 and 1000 parts-per-million of $SO_2$ derived from the said sulfite compound, the said blue fluorescent material being substantially colorless and non-toxic and lacking in objectionable taste and odor, the said blue fluorescent material being selected from the group of substances consisting of soluble organic sulfonic acid compounds, hydroxycoumarins and hydroxycoumarones.

3. The process of treating a naturally light colored food plant product which comprises the immersion of the said food plant product in a water solution of 7-hydroxy-4-methylcoumarin and soluble inorganic sulfite compound, said solution containing between approximately 300 and 1000 parts-per-million of $SO_2$ derived from the said sulfite compound.

4. The process of treating a naturally light colored food plant product which comprises the immersion of the said food plant product in a water solution of 7-hydroxy-4-methylcoumarin, the concentration of the 7-hydroxy-4-methylcoumarin in the said water solution being between about 0.001% and saturation.

5. As a new article of manufacture, a food plant product of improved whiteness and keeping quality which comprises a naturally light colored food plant product treated with a substantially colorless blue fluorescent material, the said blue fluorescent material being 7-hydroxy-4-methylcoumarin.

JACK DE MENT.
GEORGE LAMONT.
JIM POLLY.

REFERENCES CITED

The following references are of record in the file of this patent:

FOREIGN PATENTS

| Number | Country | Date |
|---|---|---|
| 551,714 | Great Britain | of 1943 |

OTHER REFERENCES

Fluorochemistry, by De Ment, 1945, page 555.